United States Patent
Gospodinov

(10) Patent No.: US 10,810,595 B2
(45) Date of Patent: Oct. 20, 2020

(54) SYSTEMS AND METHODS FOR REAL-TIME DATA PROCESSING, MONITORING, AND ALERTING

(71) Applicant: Walmart Apollo, LLC, Bentonville, AR (US)

(72) Inventor: Georgi D. Gospodinov, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 84 days.

(21) Appl. No.: 16/130,095

(22) Filed: Sep. 13, 2018

(65) Prior Publication Data

US 2019/0080328 A1 Mar. 14, 2019

Related U.S. Application Data

(60) Provisional application No. 62/557,889, filed on Sep. 13, 2017.

(51) Int. Cl.
*G06Q 20/40* (2012.01)
*G06Q 20/20* (2012.01)

(52) U.S. Cl.
CPC ....... *G06Q 20/4016* (2013.01); *G06Q 20/202* (2013.01); *G06Q 20/206* (2013.01)

(58) Field of Classification Search
CPC . G06Q 20/4016; G06Q 20/202; G06Q 20/206
USPC ...................... 709/217–223; 705/21, 28–30; 235/380–383
See application file for complete search history.

(56) References Cited

U.S. PATENT DOCUMENTS

| | | | |
|---|---|---|---|
| 6,189,789 B1 | 2/2001 | Levine et al. | |
| 6,947,937 B1* | 9/2005 | Winter | G06F 16/248 707/803 |
| 7,233,843 B2 | 6/2007 | Budhraja et al. | |
| 7,233,933 B2 | 6/2007 | Horvitz et al. | |
| 7,543,739 B2 | 6/2009 | Brown et al. | |
| 7,689,455 B2 | 3/2010 | Fligler et al. | |
| 7,780,081 B1 | 8/2010 | Liang | |
| 7,805,362 B1 | 9/2010 | Merrell et al. | |

(Continued)

FOREIGN PATENT DOCUMENTS

| | | |
|---|---|---|
| JP | 2008027286 A | 2/2008 |
| JP | 2008203974 A | 9/2008 |

(Continued)

OTHER PUBLICATIONS

International Search Report and Written Opinion, Application No. PCT/US18/50825, dated Dec. 6, 2018, 10 pages.

(Continued)

*Primary Examiner* — Andrew Joseph Rudy
(74) *Attorney, Agent, or Firm* — Patterson Thuente Pedersen, P.A.; Christian Girtz

(57) ABSTRACT

Large quantities of stored data from a plurality of sources, as well as large quantities of incoming real-time data that may also be coming from a plurality of sources, can be compared by pre-modeling, indexing, and aggregating data prior to conducting the comparison. A system can include a monitoring and alerting agent, an interactive visualization agent, and a machine learning agent to provide up-to-date transaction-level, store-level, and customer-level alerting and attribution.

20 Claims, 5 Drawing Sheets

(56) References Cited

U.S. PATENT DOCUMENTS

| | | | |
|---|---|---|---|
| 7,980,464 | B1 | 7/2011 | Sarris et al. |
| 8,412,601 | B2 | 4/2013 | Grant, Jr. et al. |
| 8,438,074 | B2* | 5/2013 | Serbanescu ........ G06Q 30/0601 705/26.4 |
| 8,527,418 | B2 | 9/2013 | Enzaldo et al. |
| 8,606,706 | B2 | 12/2013 | Zanzot et al. |
| 8,612,573 | B2* | 12/2013 | Seidman ............ G06F 11/3419 709/223 |
| 8,639,592 | B1* | 1/2014 | Rouse .................. G06Q 20/28 235/380 |
| 8,666,841 | B1 | 3/2014 | Claridge et al. |
| 8,725,667 | B2 | 5/2014 | Kaushal et al. |
| 8,732,013 | B2* | 5/2014 | Senghore ............ B01J 23/6562 705/14.28 |
| 8,751,399 | B2 | 6/2014 | Kolhatkar et al. |
| 9,195,822 | B2* | 11/2015 | Carlson .................. G06F 21/45 |
| 9,256,761 | B1 | 2/2016 | Sahu |
| 9,384,629 | B2 | 7/2016 | Chun et al. |
| 9,892,438 | B1 | 2/2018 | Kunda et al. |
| 10,394,809 | B1* | 8/2019 | Lu ..................... G06F 16/24568 |
| 10,394,810 | B1* | 8/2019 | Lu .......................... G06F 17/18 |
| 10,430,387 | B2* | 10/2019 | Falkenberg ......... G06F 16/9536 |
| 2002/0099579 | A1 | 7/2002 | Stowell et al. |
| 2003/0033228 | A1 | 2/2003 | Bosworth-Davies et al. |
| 2006/0294095 | A1 | 12/2006 | Berk et al. |
| 2007/0050777 | A1 | 3/2007 | Hutchinson et al. |
| 2007/0063016 | A1 | 3/2007 | Myatt et al. |
| 2007/0282665 | A1 | 12/2007 | Buehler et al. |
| 2008/0288889 | A1 | 11/2008 | Hunt et al. |
| 2009/0058644 | A1 | 3/2009 | French et al. |
| 2010/0004981 | A1 | 1/2010 | Katz et al. |
| 2010/0058345 | A1 | 3/2010 | Seldman et al. |
| 2010/0114617 | A1 | 5/2010 | Bobbitt |
| 2010/0153225 | A1 | 6/2010 | Ferro et al. |
| 2010/0169137 | A1 | 7/2010 | Jastrebski et al. |
| 2010/0274679 | A1 | 10/2010 | Hammad |
| 2011/0035271 | A1 | 2/2011 | Weaver et al. |
| 2011/0087535 | A1 | 4/2011 | Yoshizawa et al. |
| 2011/0270618 | A1 | 11/2011 | Banerjee et al. |
| 2012/0041838 | A1 | 2/2012 | Serbanescu |
| 2012/0095805 | A1 | 4/2012 | Ghosh et al. |
| 2012/0226613 | A1 | 9/2012 | Adjaoute |
| 2012/0320214 | A1 | 12/2012 | Kundu |
| 2013/0018796 | A1 | 1/2013 | Kolhatkar et al. |
| 2013/0027561 | A1 | 1/2013 | Lee et al. |
| 2014/0058914 | A1 | 2/2014 | Song et al. |
| 2014/0095281 | A1 | 4/2014 | Weiss et al. |
| 2014/0188639 | A1 | 7/2014 | Dinardo |
| 2014/0236820 | A1 | 8/2014 | Carlton et al. |
| 2014/0365334 | A1 | 12/2014 | Hurewitz |
| 2015/0029339 | A1 | 1/2015 | Kobres et al. |
| 2015/0032752 | A1 | 1/2015 | Greifeneder et al. |
| 2015/0041616 | A1 | 2/2015 | Gentile et al. |
| 2015/0081349 | A1 | 3/2015 | Johndrow et al. |
| 2015/0088652 | A1 | 3/2015 | Finley et al. |
| 2015/0088753 | A1 | 3/2015 | Van der Schueren |
| 2015/0095189 | A1 | 4/2015 | Dharssi et al. |
| 2015/0127496 | A1 | 5/2015 | Marathe et al. |
| 2015/0149365 | A1 | 5/2015 | Mobini |
| 2015/0161596 | A1 | 6/2015 | McCarthy |
| 2015/0193794 | A1 | 7/2015 | Douglas et al. |
| 2015/0242899 | A1 | 8/2015 | Farhi |
| 2015/0279155 | A1 | 10/2015 | Chun et al. |
| 2016/0110791 | A1 | 4/2016 | Herring et al. |
| 2016/0125492 | A1 | 5/2016 | Walker et al. |
| 2016/0189159 | A1 | 6/2016 | Luk et al. |
| 2016/0314449 | A1 | 10/2016 | Shmilovitz |
| 2016/0335666 | A1 | 11/2016 | Dodor et al. |
| 2017/0004422 | A1 | 1/2017 | Todd et al. |
| 2017/0046708 | A1 | 2/2017 | High et al. |
| 2017/0083985 | A1 | 3/2017 | Lacoss-Arnold et al. |
| 2017/0323359 | A1 | 11/2017 | Det et al. |
| 2018/0322514 | A1 | 11/2018 | Sargent et al. |

FOREIGN PATENT DOCUMENTS

| | | |
|---|---|---|
| WO | WO 00/73971 A1 | 12/2000 |
| WO | WO 03/077569 A1 | 9/2003 |
| WO | WO 2015/103020 A1 | 7/2015 |
| WO | WO 2016/138183 A1 | 9/2016 |

OTHER PUBLICATIONS

International Preliminary Report on Patentability, Application No. PCT/US18/50825, dated Mar. 17, 2020, 6 pages.

International Search Report and Written Opinion for corresponding PCT Application No. PCT/US2018/047513 dated Oct. 19, 2018; 7 pages.

Ogbodo et al.; "The Economic Implications of Money Laundering in Nigeria", HR$_{MARS}$ Exploring Intellectual Capital; International Journal of Academic Research in Accounting, Finance and Management Sciences; vol. 3, No. 4, Oct. 2013, pp. 170-184; E-ISSN: 2225-8329, P-ISSN: 2308-0337; 15 pages total; www.hrmars.com.

U.S. Appl. No. 16/108,826, filed Aug. 22, 2018, Inventor(s): Moustafa et al.

U.S. Appl. No. 16/106,632, filed Aug. 21, 2018, Inventor(s): Fenton et al.

Application and Filing Receipt for U.S. Appl. No. 15/583,264, filed May 1, 2018, Inventor(s): Dey et al.

Application and Filing Receipt for U.S. Appl. No. 15/972,743, filed May 7, 2018, Inventor(s): Sargent et al.

Application and Filing Receipt for U.S. Appl. No. 15/226,540, filed Aug. 2, 2016, Inventor(s): High et al.

International Search Report and Written Opinion for PCT Application No. PCT/US2017/030389, dated Jul. 19, 2017, 9 pages.

International Search Report and Written Opinion for corresponding International Application No. PCT/US2018/031388 dated Aug. 2, 2018; 6 pages.

FRAMES; Fraud Real-Time Alerting & Monitoring Enterprise System, ZMS Info; 2012; 2 pages.

International Search Report and Written Opinion for PCT Application No. PCT/US2018/047305 dated Nov. 7, 2018; 7 pages.

* cited by examiner

SYSTEMS AND METHODS FOR REAL-TIME DATA PROCESSING, MONITORING, AND ALERTING

RELATED APPLICATION

The present application claims the benefit of U.S. Provisional Application No. 62/557,889 filed Sep. 13, 2017, which is hereby incorporated herein in its entirety by reference.

TECHNICAL FIELD

Embodiments of the present disclosure relate generally to the field of monitoring or identifying anomalous transactions or anomalous organized behavioral patterns (behavioral signatures).

BACKGROUND

Unusual transaction data can be attributed to any of a variety of sources. In some instances, abnormal transaction data can be attributable to events, weather, or other unpredictable or non-periodic events. In other instances, abnormal transaction data can be attributable to errors in pricing, or unusual consumer activity. Transactional and other behavioral data (such as installing a mobile app, visiting multiple store locations, transacting primarily using giftcards or unusual payment methods) can help detect and rank unusual behavioral patterns within the subject population of customers or employees.

Transaction and customer data for retail or other complex operations is typically collected at a variety of sources. For example, transaction and behavioral profile data may be collected separately for online purchases and in-store purchases. Furthermore, in-store purchases can be collected in different systems for each of several different categories of goods, such as a general cashier, a pharmacy, or an electronics department. Each of these departments may store information in a different system and can provide access to different types of information. Additionally, emerging retail technology enables transaction services that integrate a real-time online transaction and an in-store transaction as part of a single transactional event, creating very complex customer behavioral patterns and signatures indicative of anomalies.

SUMMARY

Embodiments of the present disclosure relate to systems and methods that can detect anomalous transactions and behavioral patterns rapidly, based on real-time data inputs from a variety of sources and on analytical tools applied to historical transaction and behavioral data.

Embodiments of the present disclosure include a system for monitoring large quantities of real-time data to produce a customizable visualization indicative of detected anomalous transaction type, such as indications of potential gift card misuse or other organized behavior based on tender, mobile device, account, identity, and other misuse. The system can include a front-end application configured for defining a filter by various parameters, including temporal, geographic, customer, transactional, account, tender, device, or other parameters. The system can further include a database containing a plurality of static historical data, and a plurality of sources of real-time data. The system can include an ingestion module configured to apply the filter to the real-time and static data to generate filtered real-time and static data. The system can include an integration module configured to integrate data from the plurality of sources of real-time data and enrich the integrated data such that the integrated data has a common format. The system can include an analytic enrichment engine configured to combine the filtered static data with the integrated real-time data to generate the custom visualization of the real-time data at the front-end application. Based on the custom visualization, a user at the front-end application can generate and monitor metrics relating to individual data.

In embodiments, the system can include a monitoring agent configured to generate an alert when the integration module detects a variation between the data from the plurality of real-time data sources and an expected range based on the filtered static data.

In embodiments, the expected range is generated by the monitoring agent based upon the filtered static data corresponding to non-anomalous transactions and behavioral trends. In embodiments, the monitoring agent is configured to detect customers exhibiting anomalous behaviors, such as transactional and other fraud, misuse of gift cards or credit cards.

In embodiments, the system includes an analytical engine configured to generate the alert. Still further, the analytical engine can produce the alert based upon a behavior analytics model, such as one in which the analytical engine is configured to apply the behavior analytics model to all of the data from the plurality of real-time data sources simultaneously. For example, the analytics model can be a complex graph-based model.

In embodiments, the alert is based upon an indication of certain kinds of anomalous transactions by a particular subject or subjects sharing similar anomalous behavioral patterns. In embodiments, the alert is based upon an indication of certain kinds of anomalous transactions relating to a particular item, credit card, gift card, device, account, service, or subject group within the same network model neighborhood.

Embodiments of the present disclosure include a method for monitoring a plurality of real-time data sources simultaneously and generating a custom visualization indicative of detected fraud or anomalies. The method can include defining a filter at a front-end application, storing a plurality of static data at a database, engineering static data attributes and ranking the behavioral patterns (signatures) derived from these attributes using machine learning methods, ingesting the static data, behavioral signatures, and rankings at an ingestion module configured to apply the filter to the static data, integrating data from a plurality of sources of real-time data at an integration module, enriching the integrated data from the plurality of sources of real-time data such that the integrated data all has a common format, and combining the filtered static data and the enriched real-time data to generate the custom visualization of the real-time data at the front-end application, such that a user at the front-end application can generate and monitor metrics relating to individual data.

In embodiments, the method includes detecting a variation between the data from the plurality of real-time data sources and an expected range based on the filtered static data. In embodiments, the method includes generating an alert based upon the detected variation.

In embodiment, monitoring metrics relating to individual data comprises determining the expected range based upon the filtered static data corresponding to non-fraudulent transactions. In embodiments, monitoring metrics relating to individual data comprises detecting misuse of gift cards, credit cards, devices, account, services, and overall organized fraudulent behavior.

In embodiments, the method includes producing an alert at an analytics module based upon a behavior analytics model. Producing the alert based upon the behavior analytics module can include applying the behavior analytics model to all of the data from the plurality of real-time data sources simultaneously. The analytics model can be a machine learning algorithm combined with a network-based behavioral model, such as a gravitational model. The alert can be based upon an indication of certain kinds of anomalous transactions by a particular subject or a particular item, tender, device, or account, in embodiments.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
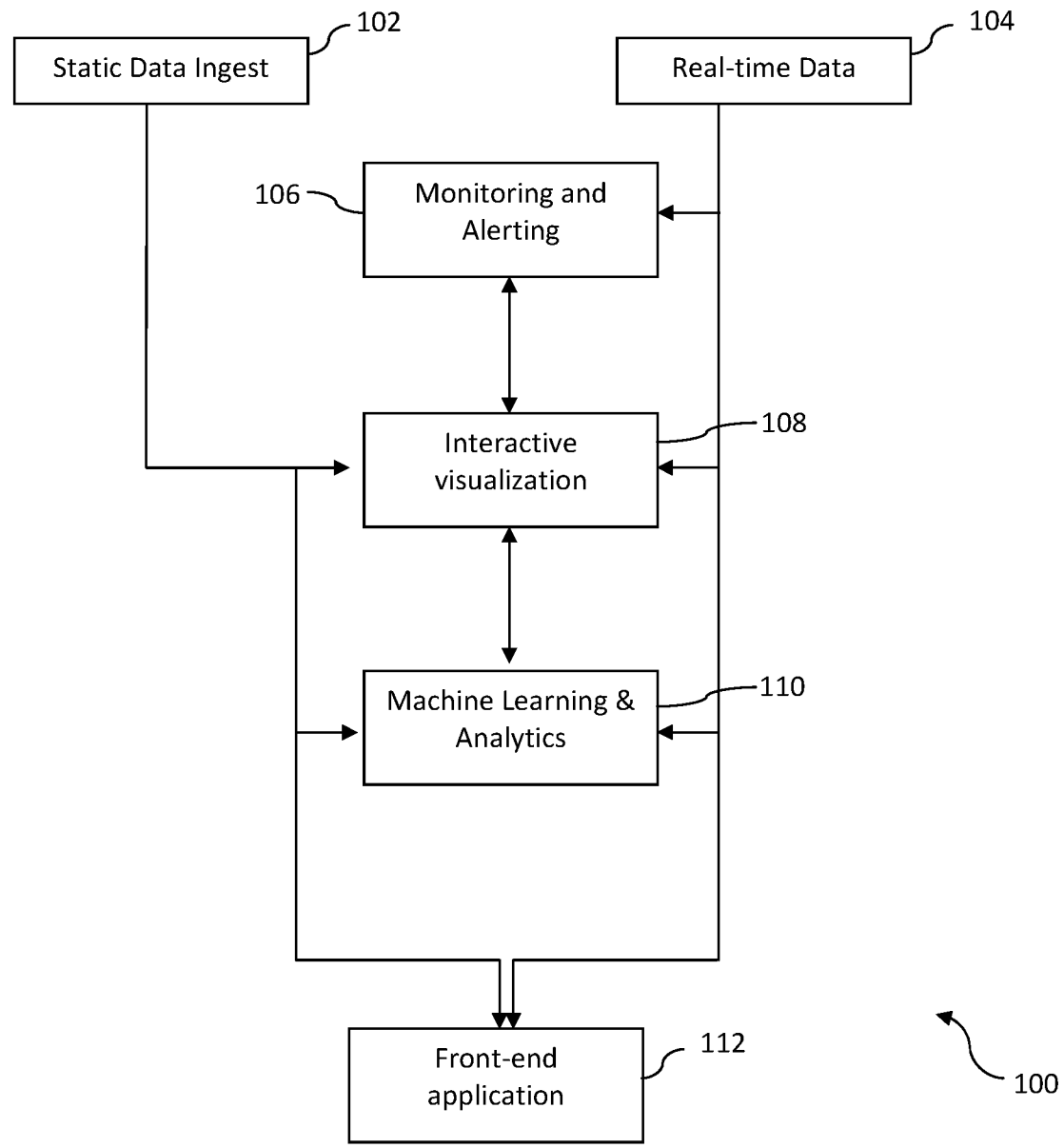
FIG. 1 is a simplified schematic chart depicting data flow according to an embodiment.

While various embodiments are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments described herein combine and analyze large quantities of data in order to present anomalous events or transactions to a user rapidly and accurately. These anomalous results can be detected based upon comparisons to data from a variety of real-time data sources, as compared to a variety of static data sources. In embodiments, data from static data sources is enriched for more rapid, direct comparison with real-time data to identify anomalies. An improvement in computer capabilities results, whereby less computational power and less time are required to detect changes from normal purchasing activity. Detecting such changes can be helpful to protect customers while they are shopping at stores that use systems as described in the following embodiments. Although the embodiments described below relate to retail establishments, the disclosure may be equally applicable to other types of transaction monitoring or modeling. For example, one of skill in the art will recognize that the monitoring systems described herein could be used to detect anomalous non-financial transactions, such as types of products being purchased, web traffic monitoring to detect denial-of-service or other types of attacks that are identifiable by anomalous traffic or usage.

In embodiments, various computerized systems are configured to manage large quantities of real-time data. For example, in embodiments computerized systems could simultaneously monitor weather, traffic, breaking news at a local, regional, national, and/or international level, as well as trends and real-time shopping data. These large quantities of real-time data can be collected and analyzed, either separately or in combination, to detect events more rapidly and accurately than relying on conventional methods for forecasting inventory requirements. Furthermore, embodiments can track interrelations or interactions between various effects, such as fashion trends, weather, or local events, which can have different effects in combination than they would in isolation. Using machine learning and very large quantities of data, embodiments described herein can rapidly generate accurate forecasts for inventory needs based on stored data relating to statistically significant events in the past.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the embodiments described herein may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present disclosure may be written in any combination of one or more programming languages, including an object-oriented programming language such as Java, Smalltalk, C++, R, Python, Scala or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

Embodiments are described below with reference to flowchart illustrations and/or block diagrams of methods, apparatus (systems) and computer program products. Each block of the flowchart illustrations and/or block diagrams, and combinations of blocks in the flowchart illustrations and/or block diagrams, can be implemented by computer program instructions or code in embodiments. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As shown in FIG. 1, a system 100 for monitoring retail transactions includes at least one static data ingestion source 102, and at least one real-time data source 104. System 100 is simplified to show just one source of static data (102) and just one source of real-time data (104). In some embodiments, however, static data source 102 could include a plurality of sources of static data. For example, in a retail environment, static data can be stored from each of a plurality of departments, such as pharmacy, electronics, customer service, or point-of-sale (POS) transactions at the front of a store, for example. The same or other retail establishments can store data from purchases made outside of a store, such as online purchases or purchases made over the phone. Still further, some of static data sources 102 can include gift card purchase data or other behavioral signature data. In general, each static data source 102 can include different types of information. For example, it may be necessary to include some types of information in a database kept by the pharmacy that would not be required by general cashiers or online. Likewise, some static data sources 102 may include relatively little information, such as gift card transactions in which the identity of the purchaser may not be known at all. In embodiments, static data source 102 as shown in FIG. 1 can include a database having a plurality of static data.

Likewise, real-time data 104 can include incoming data from a plurality of sources. The sources may be, for example, the same sources that were previously discussed with respect to the static data source 102. The difference between static data source 102 and real-time data source 104 is that static data source 102 is stored in a condensed format at regular or irregular intervals, whereas real-time data source 104 is a streaming or real-time set of information coming into system 100. Each data source 102 and 104 can comprise one or more computer systems hosting one or more database systems, file systems, or other data storage technologies. Each data source 102 and 104 can further comprise a network interface to facilitate remote access to the data.

In one embodiment, static data includes data that is compiled over time. For example, static data can include the date that an account was opened (such as an online account enrollment date or an app installation date). Static data can also include a credit card ID, device ID from which the customer typically makes orders, total amount of orders, card brand, points or rewards balances, and any other customer-specific identifying information that can be used as a key to correlate with data received at real-time data source 104. Data stored at static data source 102 can include average transaction amounts, for example.

System 100 can therefore comprise, or be communicably coupled to stores for static and realtime data as new transaction records are created. System 100 can present one or more network interfaces to receive data (including transaction data), and provide outputs to one or more user devices.

In embodiments, static data can be generated at static data source 102 based upon a time window, such as a 30-day, 45-day, or 90-day rolling average, cumulative total, maximum, or minimum amount of some monitored quantity, for example. For some quantities, such as average transaction amount, the quantity of time is preferably 14 days or more, in order to ensure sufficient accuracy of the data. In other embodiments, such as embodiments in which past raw transaction data is stored in static data, a maximum time window of six months is preferable, in order to reduce the necessary amount of storage and computation required to use that data.

Examples of the types of information received at real-time data source 104 can include a transaction ID, customer identification information, payment type, amount of payment, date or time of payment, etc. In contrast, static data could be specific to a particular customer, but aggregated by store or payment type to provide a more general set of data without necessarily including all of the specific transaction information associated with that customer.

As shown in the simplified schematic of system 100 in FIG. 1, static data source 102 can be a static data ingestion module. Likewise, real-time data source 104 can be a real-time data ingestion module. In addition to receiving specific information that is passed on to other components of system 100, the ingestion modules can filter received data before it is transferred, as described in more detail below.

Monitoring and alerting module 106 receives real-time data and detects whether anomalous conditions are present. Monitoring and alerting module 106 can not only receive real-time data 104 but can also interact with interactive visualization 108. In embodiments, monitoring and alerting module 106 can be updated by machine learning and analytics module 110.

Interactive visualization module 108 and machine learning and analytics module 110 both receive real-time and static data. That is, static data source 102 provides data to both interactive visualization module 108 and machine learning and analytics module 110, and likewise real-time data source 104 provides data to both interactive visualization module 108 and machine learning and analytics module 110.

As described above, interactive visualization module 108 receives data from both static data source 102 and real-time data source 104. The output of interactive visualization module 108 is a visualization depicting normal or anomalous purchasing information, as requested by the front-end application 112. To create a visualization, interactive visualization module 108 compares real-time data with static data. As described above, however, static data source 102 contains information which has been stored in an aggregated form, in embodiments. Furthermore, static data source 102 contains information that includes a variety of different fields, depending upon where it was derived from. For example, as noted above, data that was stored to static data source 102 from a transaction at a pharmacy may include different fields than data from a transaction at an electronics counter, online, at a cash register, etc.

To facilitate comparison, static data source 102 can enrich the data stored therein such that it is directly comparable to real-time data, as will be described in more detail below with respect to FIG. 2. By enriching the static data at static data source 102, rapid comparison can be made between the data provided by real-time data source 104 and static data source 102. In embodiments, the enrichment of the data from static data source 102 can be modified depending upon the particular type of comparison and/or visualization desired at interactive visualization module 108.

In embodiments, interactive visualization module 108 is configured to perform real-time streaming and processing of multi-dimensional and multi-source data. In embodiments, interactive visualization module 108 can provide interactive and flexible visualization, including integration of real-time data with enriched static data. Furthermore, interactive visualization module 108 can integrate model-based attribution as described in more detail below with respect to machine learning and analytics module 110.

Machine learning and analytics module 110 also receives data from both static data source 102 and real-time data source 104. Machine learning and analytics module 110 also compares real-time data with static data. Unlike interactive visualization module 108, however, machine learning and analytics module 110 does not output any visualization to front-end application 112. Rather, machine learning and analytics module 110 determines whether anomalies are occurring based upon past transaction history. In embodiments, machine learning and analytics module 110 is configured to perform behavioral analytics, embedded machine learning and real-time analytics, dynamic model training, and model-based attribution and alerting.

Front-end application 112 is a display or other point of interaction whereby a user can set parameters or filters to detect particular types of anomalies. For example, front-end application 112 can be used to enter a filter that is sent to interactive visualization module 108. Interactive visualization module 108 can request information regarding the particular type of filtered data from machine learning and analytics module 110. An analytics enrichment engine such as analytics module 110 can be used to combine filtered static data from static data source 102 with integrated real-time data from real-time data source 104 to generate a custom visualization at visualization module 108 of the real-time data at the front-end application 112, such that a user at the front-end application 112 can generate and monitor metrics relating to that individual data using monitoring and alerting module 106.

Figure 2:
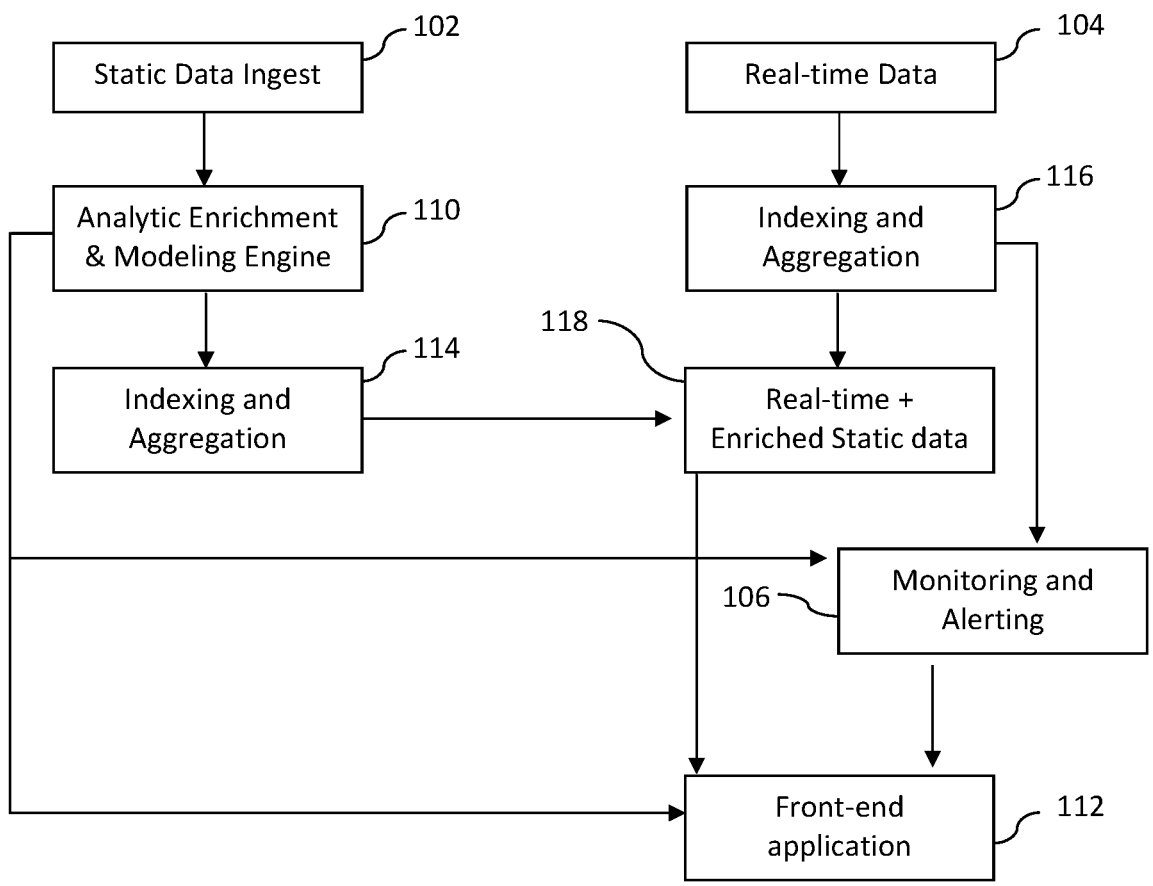
FIG. 2 is a schematic chart depicting data flow according to an embodiment.

FIG. 2 is a chart of data flow for a computer-aided system for detecting anomalous transactions, according to an embodiment. Like numerals are used to describe like parts as between FIGS. 1 and 2.

As shown in FIG. 2, system 100 includes a static data ingestion module 102 and a real-time data source 104. As previously described with respect to FIG. 1, each of these sources of data for system 100 could include a plurality of data streams, in embodiments. For example, static data ingestion module 102 could include a plurality of databases each containing data from one of a plurality of stored data sources. Static data ingestion module 102 can include data sources such as information relating to past sales from each of a plurality of departments within a retail store, for example. Alternatively or additionally, static data ingestion module 102 can pull data from a source that aggregates information regarding particular customers, stores, products, or other information that is not particularized to an individual department.

In embodiments, static data ingestion module 102 can pull information from some sources that include a first subset of information, and also from a second subset of information from other sources. That is, not all of the information accessible via static data ingestion module 102 is formatted in the same way, nor does it necessarily include the same fields of information. In fact, some of the data stored in sources accessible via static data ingestion module 102 may be private and should not become accessible to others of the sources of data accessible via static data ingestion module 102. One example of this is pharmacy transaction information, which may include private information regarding a customer that should not become accessible to other departments or individuals.

Real-time data source 104 can likewise receive information from any of a plurality of data sources. Static data ingestion module 102 typically receives aggregated, stored data regarding past transactions; in contrast, real-time data source 104 receives information from various departments or online transactions in real time, as those transactions are occurring. Therefore the fields of information that are available via real-time data source 104 are typically different than those accessible via static data ingestion module 102.

Static data ingestion module 102 may include aggregated information about a particular customer's shopping habits, for example, whereas real-time data source 104 provides information about a specific, recent transaction.

The two streams of data, from static data ingestion module 102 and real-time data source 104, can be compared. By comparing these two streams of data, a retailer could determine whether or not a particular purchase (at real-time data source 104) fits with a pattern of purchases associated with the same customer (stored at static data ingestion module 102). Based on that comparison, anomalous transactions can be monitored more closely. If the anomalous transaction appears as though it was not authorized by that customer the charges can be declined, protecting both the retailer and the customer from potential losses. Because the sources of data do not include the same fields, though, the comparison cannot be made directly. For smaller numbers of transactions, comparisons can be made despite these data type mismatches, but as the number of transactions grows for a large retailer, conducting a check for each real-time data transaction against static data can consume unacceptable large amounts of computational time.

In the description below, various formats, programs, and file types are used by way of example. Those of skill in the art will recognize that these examples of formats, programs, and file types are not limiting on the disclosure, but merely describe one particular mechanism for performing the comparison between static and real-time data sources.

In one embodiment, data is pipelined from a plurality of static data sources to static data ingestion module 102 and integrated, filtered, and/or transformed from those different sources to be ingested into an analytical engine. The different sources may be, for example, point of sale (POS)

systems, customer transaction history, mobile purchases, or other sources of purchase data.

Likewise, the data received at real-time data source 104 is decrypted, for example into json format. That decrypted data can be pipelined as Kafka topic through a Storm topology into an ElasticSearch instance in one embodiment.

At indexing and aggregation module 116, the decrypted data from real-time data source 104 is pre-indexed and aggregated into an integrated environment that enables data query and traversal for dynamic publishing to an interactive front-end. As shown in FIG. 2, the data from indexing and aggregation module 116 is provided to two different modules. First, data from the indexing and aggregation module 116 is provided to monitoring and alerting agent 106. Second, data from the indexing and aggregation module 116 is provided to real-time and static data integration module 118.

Data that is provided from the indexing and aggregation module 116 to the monitoring and alerting agent 106 can be used to produce alerts. Monitoring applications run continuously on relevant attributes from the indexed data and flag certain data elements, initiate process triggers based on those data elements, and publish results in real-time to the visualization and other environments for the end user to consume. The relevant attributes can be selected by a user, for example as input at front-end application 112. Alternatively, the relevant attributes can be some subset of attributes that are continuously monitored even without a user specifying that they should be via front-end application 112. Furthermore, machine learning and analytics module 110 may determine that certain attributes are important and should be monitored, based on past anomalous events, even without a user specifying that those attributes should be monitored via front-end application 112.

In embodiments, monitoring agent 106 is configured to generate an alert when real-time and static data integration module 118 detects a variation between the data from the plurality of real-time data sources and an expected range based on the filtered static data. That is, where there is sufficiently unexpected distinction between the data received from analytic enrichment and modeling engine 110 and indexing and aggregation module 116, this difference causes an alert which is sent to front-end application 112. A sufficiently unexplained distinction can be, for example, a purchase that is outside of a range that is expected based upon the static data, or in a different location than the purchases made and stored at the static data source 102. This unexplained distinction can be any result outside of an expected range, in embodiments, where the expected range is generated by monitoring and alerting agent 106 based upon the filtered static data corresponding to non-anomalous or non-fraudulent transactions sent from analytic enrichment and modeling engine 110.

In one embodiment, monitoring and alerting agent 106 is configured to detect misuse of gift cards. In other embodiments, other criteria can be monitored to protect customers or stores from events that can be detected through anomalous usage.

Data that is provided from the indexing and aggregation module 116 to the real-time and static data integration module 118 can be used to create tables and graphical objects. The tables and graphical objects created in this way can be created based on pre-indexed data from real-time data source 104.

As described above, a second path for data from indexing and aggregation module 116, in lieu of traveling to real-time and enriched static data integration module 118, is to pass to monitoring and alerting module 106. In embodiments, all data from indexing and aggregation module 116 can be passed to both modules 106 and 116. As described above, monitoring and alerting module extracts data elements based on conditions that are met within one or more monitoring applications.

Static data ingestion module 102, as described above, receives data from one or more of a set of static data sources. The data ingested at static data ingestion module 102 can pass to analytic enrichment and modeling engine 110. At analytic enrichment and modeling engine 110, models can be run on the static data including filtering, attribution, and/or aggregation. Transaction-level and customer-level data modules can be built based upon the modeled data. In one embodiment, a gravitational model can be used, or other custom-designed algorithms can filter, attribute, or aggregate the static data.

The modeled data output by analytic enrichment and modeling engine is passed to indexing and aggregation module 114. Indexing and aggregation module 114 is similar to indexing and aggregation module 116. A difference between these two, however, is that indexing and aggregation module 114 can be used to index and aggregate static data, whereas indexing and aggregation module 116 can be used to index and aggregate real-time data.

Alternatively and/or additionally, data from analytic enrichment and modeling engine 110 can pass to monitoring and alerting module 106. Modeled static data is thus provided in combination with the indexed and aggregated real-time data from indexing and aggregation module 116. Monitoring and alerting module 106 receives these two sets of data, and additional pipelines of information can branch out to provide direct input to the front-end application 112 to facilitate dynamic visualization of a customer, device, or tender-based associations and correlations, and to identify anomalous activity.

Likewise, data from analytic enrichment and modeling engine 110 can pass directly to front-end application 112. This additional pipeline of information can branch out for specific alerting or monitoring services such as end-user-defined ad hoc flags or for identification outliers detected in the analytical process of system 100.

As shown in FIG. 2, indexed and aggregated real-time data is provided to real-time data and enriched static data integration module 118. Likewise, indexed and aggregated static data that has been modeled from multiple sources is provided to real-time data and enriched static data integration module 118. At module 118, attributes, analytically-derived flags, and additional procedures insert the derived data to front-end application 112, enabling an end user to interact with the data and customize the front-end application 112, as well as adjust the flags or other criteria that create a feedback loop into the analytical engine layers. That is, based on information received at front-end application 112, the thresholds or criteria for determining whether an event is anomalous are modified at various intermediate stages, such as at monitoring and alerting module 106.

Real-time and enriched static data integration module 118 can be an analytical engine, in embodiments. For example, real-time and enriched static data integration module can be an analytical engine that is configured to produce alerts based upon a behavior analytics model. Where actual, real-time data sent from indexing and aggregation module 116 falls outside of the behavior analytics module, the analytical engine 118 can produce an alert that is sent to front-end application 112. In embodiments, real-time and enriched static data integration module 118 can apply a behavior analytics model to all of the real-time data simultaneously, which has been indexed and aggregated at module 116, from a plurality of real-time data sources.

Figure 3:
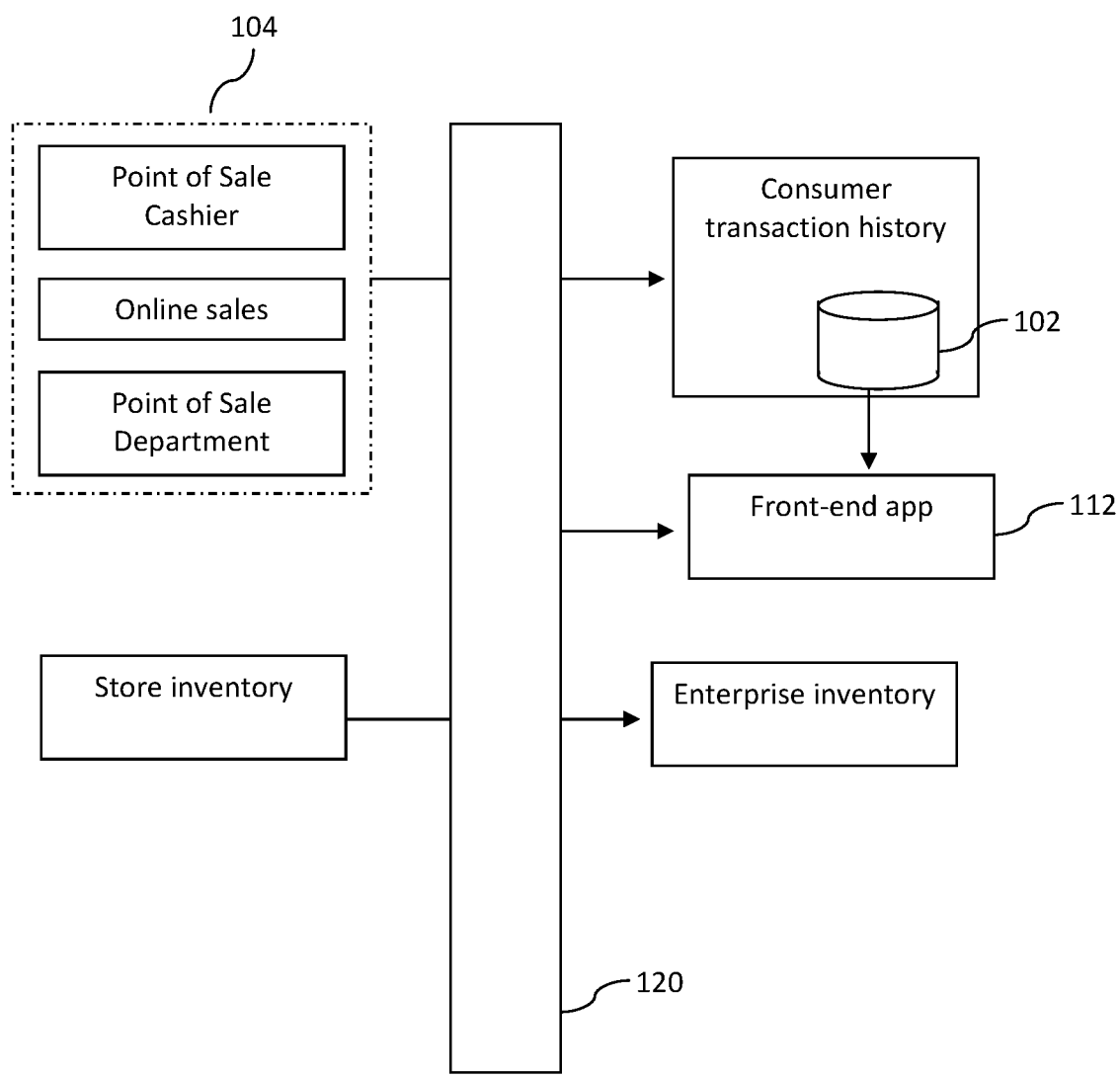
FIG. 3 is a schematic of a system for monitoring and managing purchases and inventory for a series of retail stores according to an embodiment.

FIG. 3 is an overall architecture of a system for monitoring and managing purchases and inventory for a series of retail stores. As depicted in FIG. 3, the overall system includes static data source 102, real-time data source 104, and front-end application that receives data from those two subsystems. In addition, FIG. 3 depicts channel 120, which facilitates data transfer between inventory and sale systems.

As shown in FIG. 3, real-time data source 104 includes point of sale cashier data, online sales, and department sales (e.g., pharmacy, electronics, etc.). The point of sale data, along with store inventory data, pass through channel 120 to update enterprise inventory as well as monitor customer transaction data. Some or all of the customer transaction data from channel 120 can be stored at static data source 102, which is a database in the embodiment shown in FIG. 3.

The front-end app receives information from real-time and static data sources, and is configured to provide an indication of unusual transactions based on any criteria specified by the user. Furthermore, a subset of transactions can be identified by a user periodically, in order to teach front-end app which transactions are based on improper use of a gift card, credit card, or online system. Based on these inputs, system 100 can employ machine learning to identify patterns indicative of anomalous or improper use of these payment mechanisms.

Figure 4:
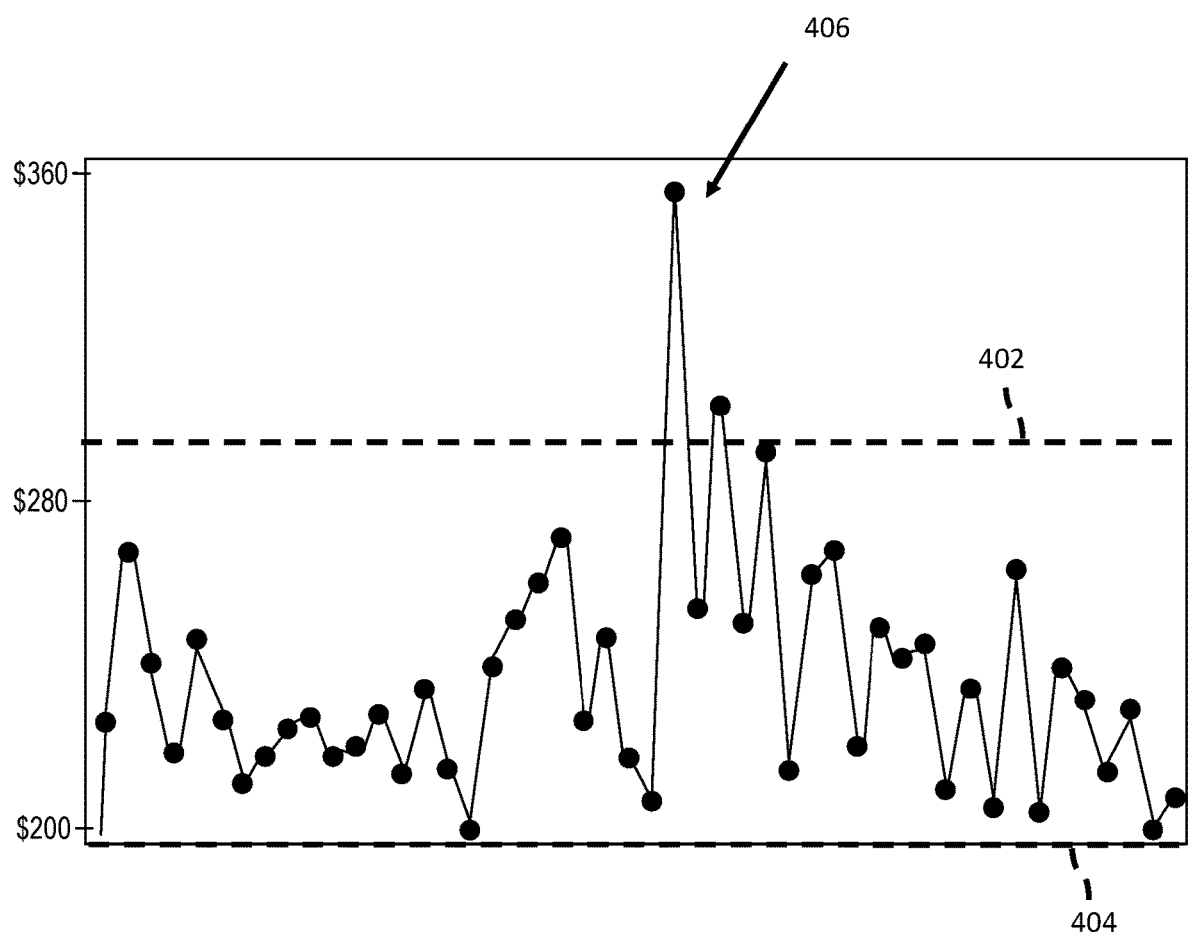
FIG. 4 is a chart depicting anomalous transaction data according to an embodiment of a monitoring display.

FIG. 4 is one example of an embodiment in which an indication of unusual transactions has occurred. Based upon input data fed into system 100, it has identified upper bound 402 and lower bound 404 for transactions that are likely to be based upon unauthorized use of a card. Data points 406 are above upper bound 402, and so they are flagged as suspicious transactions. Transaction amount is a simple metric to track, but system 100 can track other metrics that may be more complex, or even interactions between two types of transactions. For example, multiple large transactions within different stores may be more likely to indicate anomalous usage of a credit card than a single, large transaction. Likewise, a single large transaction may be less likely to be based on credit card misuse if it is related to a one-time purchase of a large item, especially where the data in static data source 102 indicates that the large item is one which that customer would likely purchase. Many other such interactions can be tracked and monitored, and in fact by providing examples of purchases that have definitively been found to be based on misuse of a credit card or other payment mechanism, system 100 can monitor for interactions that would not be considered by a human.

Figure 5:
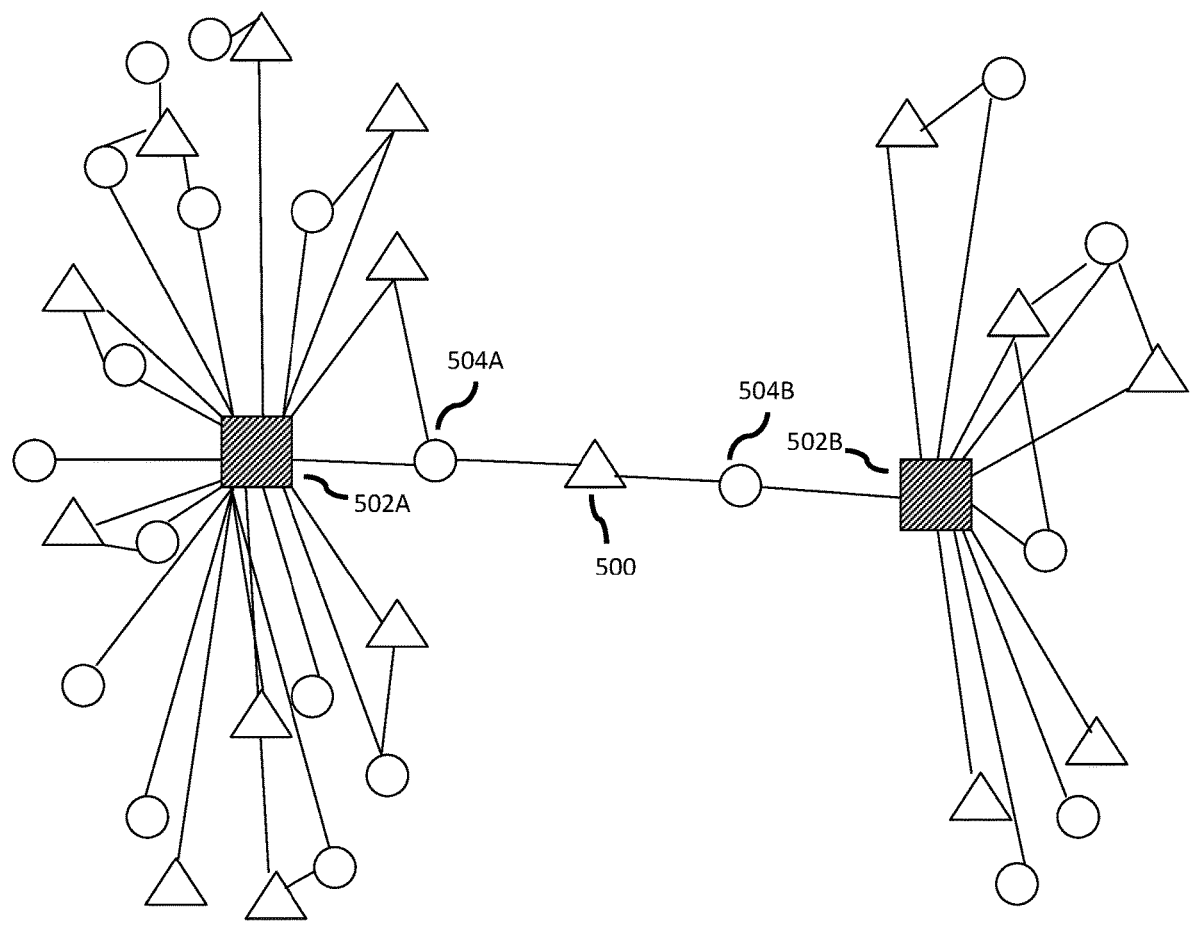
FIG. 5 is a schematic showing another type of anomalous transaction history according to another embodiment of a monitoring display.

FIG. 5 is a mesh diagram of a series of customers (triangles), payment mechanisms (circles), and computers or other devices (gray squares). FIG. 5 illustrates another type of data that can be easily stored in static data source 102, and updated with real-time data. FIG. 5 shows a pattern that is common among unauthorized uses of a customer's identity or other personal information.

It is common for a single phone, computer, or other electronic device 502 to be associated with more than one customer. Likewise, a credit card or gift card can be associated with multiple customers, and a customer can have multiple credit cards or gift cards.

As shown in FIG. 5, a single connection, customer 500, uses two credit cards (504A, 504B). What is unusual about customer 500, however, is that he or she is associated with two large groups that each are associated with a single device 502. Furthermore, customer 500 is not associated with either device, even though one of his or her cards 504A and 504B has been used on each device 502.

These types of purchasing patterns, in which one customer is associated with two groups of other cards and devices, is one type of pattern that can be monitored by system 100. Likewise, if one of these groups becomes extremely large and has many users, it can be an indication of anomalous or unauthorized use of a card or account.

These and other phenomena can be monitored by systems such as system 100. When unauthorized use is detected quickly, those uses can be stopped more rapidly, improving customer security and reducing liability both to customers and to retailers.

In alternative embodiments, systems such as the one described above could be employed in various other situations, and not just in retail environments as described above. In many other fields, there may be large quantities of stored data from a plurality of sources, as well as large quantities of incoming real-time data that may also be coming from a plurality of sources. Comparison of such data in an efficient manner can be accomplished by pre-modeling and enriching the static data such that it can be directly compared and so that monitoring and alerting can be conducted in a more expedient manner.

The individual steps used in the methods described herein may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application-specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These are given only by way of example and are not intended to limit the scope of the claimed embodiments. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed embodiments.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for monitoring large quantities of real-time data to produce a customizable visualization indicative of detected anomalous transactions, the system comprising:
a front-end application configured for defining a filter;
a database containing a plurality of static data;
a plurality of sources of real-time data;
an ingestion module configured to apply the filter to the static data to generate filtered static data;
an integration module configured to integrate data from the plurality of sources of real-time data and enrich the integrated real-time data such that the integrated real-time data has a common format; and
an analytic enrichment engine configured to combine the filtered static data with the integrated real-time data to generate the custom visualization of the real-time data at the front-end application, such that a user at the front-end application can generate and monitor metrics relating to individual data.

2. The system of claim 1, further comprising a monitoring agent configured to generate an alert when the integration module detects a variation between the data from the plurality of real-time data sources and an expected range based on the filtered static data.

3. The system of claim 2, wherein the expected range is generated by the monitoring agent based upon the filtered static data corresponding to non-anomalous transactions.

4. The system of claim 2, wherein the monitoring agent is configured to detect misuse of gift cards.

5. The system of claim 2, further comprising an analytical engine configured to generate the alert.

6. The system of claim 5, wherein the analytical engine produces alerts based upon a behavior analytics model.

7. The system of claim 6, wherein the analytical engine is configured to apply the behavior analytics model to all of the data from the plurality of real-time data sources simultaneously.

8. The system of claim 6, wherein the behavior analytics model is a gravitational model.

9. The system of claim 2, wherein the alert is based upon an indication of an anomalous type of transaction by a particular customer.

10. The system of claim 2, wherein the alert is based upon an indication of an anomalous type of transaction relating to a particular item.

11. A method for monitoring a plurality of real-time data sources simultaneously and generating a custom visualization indicative of detected anomalies, the method comprising:
defining a filter at a front-end application;
storing a plurality of static data at a database;

ingesting the static data at an ingestion module configured to apply the filter to the static data;

integrating data from a plurality of sources of real-time data at an integration module;

enriching the integrated real-time data from the plurality of sources of real-time data such that the integrated real-time data all has a common format; and combining the filtered static data and the enriched real-time data to generate the custom visualization of the real-time data at the front-end application, such that a user at the front-end application can generate and monitor metrics relating to individual data.

12. The method of claim 11, further comprising detecting a variation between the data from the plurality of real-time data sources and an expected range based on the filtered static data.

13. The method of claim 12, further comprising generating an alert based upon the detected variation.

14. The method of claim 12, wherein monitoring metrics relating to individual data comprises determining the expected range based upon the filtered static data corresponding to non-anomalous transactions.

15. The method of claim 12, wherein monitoring metrics relating to individual data comprises detecting misuse of gift cards.

16. The method of claim 11, further comprising producing an alert at an analytics module based upon a behavior analytics model.

17. The method of claim 16, wherein producing the alert based upon the behavior analytics model comprises applying the behavior analytics model to all of the data from the plurality of real-time data sources simultaneously.

18. The method of claim 16, wherein the behavior analytics model is a gravitational model.

19. The system of claim 13, wherein the alert is based upon an indication of a type of anomalous transaction by a particular customer.

20. The system of claim 13, wherein the alert is based upon an indication of a type of anomalous transaction relating to a particular item.

* * * * *